(12) United States Patent
Weiss et al.

(10) Patent No.: US 10,940,712 B2
(45) Date of Patent: Mar. 9, 2021

(54) ARRANGEMENT, ARTICLE HAVING A SECURITY FEATURE AND METHOD FOR THE MANUFACTURE OF AN ARRANGEMENT FOR A SECURITY FEATURE

(71) Applicant: Schreiner Group GmbH & Co. KG, Oberschleissheim (DE)

(72) Inventors: Oliver Weiss, Munich (DE); Nadine Lampka, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 225 days.

(21) Appl. No.: 15/993,689

(22) Filed: May 31, 2018

(65) Prior Publication Data

US 2018/0345713 A1    Dec. 6, 2018

(30) Foreign Application Priority Data

Jun. 1, 2017    (DE) .................... 10 2017 112 119.6

(51) Int. Cl.
| | | |
|---|---|---|
| B42D 25/378 | (2014.01) |
| B42D 25/382 | (2014.01) |
| B42D 25/387 | (2014.01) |
| G09F 3/00 | (2006.01) |
| B42D 25/45 | (2014.01) |
| B42D 25/485 | (2014.01) |
| B42D 25/41 | (2014.01) |
| G09F 3/02 | (2006.01) |
| B42D 25/29 | (2014.01) |
| B42D 25/355 | (2014.01) |
| C09D 11/50 | (2014.01) |

(52) U.S. Cl.
CPC .......... *B42D 25/378* (2014.10); *B42D 25/382* (2014.10); *B42D 25/387* (2014.10); *B42D 25/41* (2014.10); *B42D 25/45* (2014.10); *B42D 25/485* (2014.10); *C09D 11/50* (2013.01); *G09F 3/0291* (2013.01); *G09F 3/0294* (2013.01); *B42D 25/29* (2014.10); *B42D 25/355* (2014.10); *G09F 2003/0276* (2013.01)

(58) Field of Classification Search
None
See application file for complete search history.

(56) References Cited

U.S. PATENT DOCUMENTS

| | | | | |
|---|---|---|---|---|
| 4,833,311 A | * | 5/1989 | Jalon .................. | G07D 7/12 235/491 |
| 2005/0109984 A1 | | 5/2005 | Potyrailo et al. | |
| 2013/0181144 A1 | | 7/2013 | Rapoport et al. | |

FOREIGN PATENT DOCUMENTS

| | | |
|---|---|---|
| DE | 603 15 049 T2 | 4/2008 |
| EP | 0 930 352 A1 | 7/1999 |
| EP | 1 066 978 A2 | 1/2001 |

(Continued)

*Primary Examiner* — Laura C Powers
(74) *Attorney, Agent, or Firm* — Collard & Roe, P.C.

(57) ABSTRACT

An arrangement includes a component and a temperature-dependent, first fluorescent dye, which in a first state has a predetermined first color location and in a second state has a predetermined second color location different from the first color location, and which is disposed on the component or integrated in the component in such a way that the luminescent dye, in dependence on a temperature change acting on it, creates an optically recognizable color change from the first color location to the second color location.

17 Claims, 10 Drawing Sheets

(56) References Cited

FOREIGN PATENT DOCUMENTS

| | | |
|---|---|---|
| EP | 1 456 213 B1 | 3/2005 |
| EP | 1 548 657 B1 | 7/2007 |
| EP | 2 871 216 A1 | 5/2015 |
| EP | 3 150 763 A1 | 4/2017 |
| GB | 2 401 710 A1 | 11/2004 |
| WO | 2015/122895 A1 | 8/2015 |

* cited by examiner

Fig. 5A
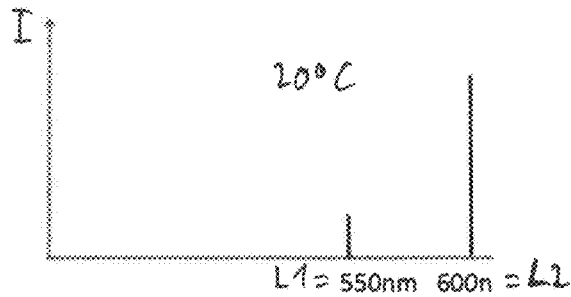
Fig. 5B
Fig. 7
| F | 10 | 20 | 30 |
|---|---|---|---|
| 20°C-40°C | F1' | F2' | F3' |
| UV (20°C) | F1a | F2 | F3 |
| UV (-40°C) | F1b | F2 | F3 |
Fig. 6A
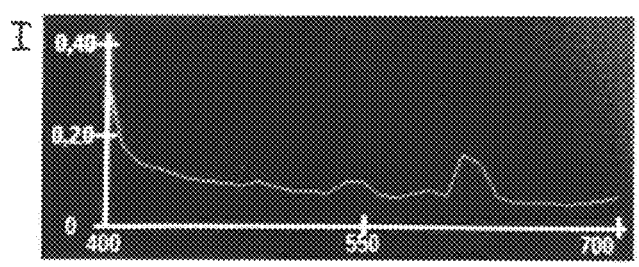
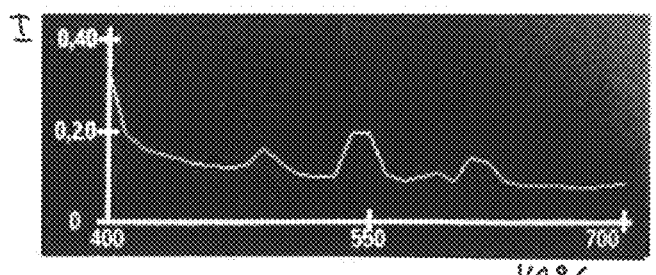
Fig. 6B

ARRANGEMENT, ARTICLE HAVING A SECURITY FEATURE AND METHOD FOR THE MANUFACTURE OF AN ARRANGEMENT FOR A SECURITY FEATURE

CROSS REFERENCE TO RELATED APPLICATIONS

Applicant claims priority under 35 U.S.C. § 119 of German Application No. 10 2017 112 119.6 filed Jun. 1, 2017, the disclosure of which is hereby incorporated by reference.

BACKGROUND OF THE INVENTION

1. Field of the Invention

The present invention relates to an arrangement, which in particular is used as a security feature for an article, for example for a security label, in order to permit a confirmation of an originality of an article on the basis of the security feature and to contribute to an enhanced protection against manipulation. The present invention relates, moreover, to a label or another article provided with such an arrangement as a security feature as well as to a method for the manufacture of an arrangement for a security feature.

2. Description of the Related Art

Labels offer a large number of possibilities for use, especially as an identifying medium. For example, security labels serve for an authorization or a proof of origin. They are used where it is expedient to verify articles and to show their originality. In this connection, a high protection against manipulation for security labels and a reliable identification of the originality of an article are desirable.

SUMMARY OF THE INVENTION

It is therefore an object of the invention to provide an arrangement that can be used as a security feature, a security label provided therewith or another article as well as a method for the manufacture of the arrangement, in order to permit an even more secure and more reliable recognition of the originality of an article and to contribute to an improved protection against manipulation.

These and other objects are accomplished by the features according to the invention. Advantageous configurations are specified in particular in the discussion below.

According to one aspect of the invention, an arrangement comprises a component and a temperature-dependent, first luminescent dye. The first luminescent dye in a first state has a predetermined first color location and in a second state has a second color location different from the first color location. The luminescent dye is disposed on the component or integrated in the component in such a way that it changes from the first into the second state in dependence on a temperature change acting on it and creates an optically recognizable, reversible color change from the first color location to the second color location.

By means of the luminescent dye, a temperature-dependent security feature, which permits a simple and reliable check of the genuineness of an article, can be realized in or on the article. This article comprises at least the described component, which is formed, for example, as a fiber, paper element or label layer.

The first state represents in particular a first temperature of the arrangement or of the temperature-dependent luminescent dye on or in the component in conjunction with the first color location. For example, in the first state, the first color location is defined at room temperature. The second state represents a circumstance different from the first state, so that the second color location is defined at negative Celsius temperatures, for example, and differs in distinctly recognizable manner from the first state and the first color location. Alternatively, the first state and the second state as well as the first color location and the second color location of the temperature-dependent luminescent dye may also be formed in predetermined manner at other temperatures. Moreover, the luminescent dye may also be referred to as luminescent ink within the scope of the present invention.

The respective color location is defined, for example, in accordance with the CIE standard valence system or CIE standard color system of the International Commission on Illumination (French: Commission internationale de l'éclairage, CIE), and represents a relationship between the human perception of color and the physical causes of the color stimulus. Thus it encompasses the entirety of perceptible colors. Using color space coordinates, a color location can be assigned to a CIE color space.

The temperature-dependent (first) luminescent dye is admixed with the associated raw material, for example during the manufacture of an article or of the component, or is applied on the configured and prepared component, so that its respective color location is optically recognizable. This term "optically recognizable" may comprise a detection of the color location with a sensor system capable of doing so, but in particular may also comprise a perception of the different color locations with the human eye. For example, the first color location may be predetermined or formed at a room temperature of approximately 21° C., where it has a dominant wavelength of approximately 610 nm, which appears as red-orange to the human eye. The temperature-dependent luminescent dye is then configured, for example, such that the second color location has, at a temperature of −30° C., a dominant wavelength of approximately 580 nm, which is perceived by the human eye as yellow-greenish. Instead of these color locations of wavelengths, given by way of example, any other arbitrary values may also be selected, for example such as at 550 nm and 625 nm.

The temperature-dependent luminescent dye, which has different color locations at various temperatures, comprises thermochromic pigments, for example, which are admixed with a printable, pumpable or sprayable substance, for example, with which the component is formed or treated.

The described arrangement permits an inspection of hidden luminescence. On the basis of the temperature-dependent luminescent dye and the creatable, different color locations, an inspector is able in principle to determine the change of a color location with absolute certainty. For example, the arrangement is treated with cold spray, so that the temperature-dependent luminescent dye changes its current, first color location and assumes the second color location in accordance with the temperature effect. Such a color transition takes place continuously and in addition is reversible. In order to obtain a distinctly recognizable difference of the color locations, a corresponding temperature difference, which acts on the luminescent dye, is beneficial.

With a commercial cold spray, it is possible, for example, to establish a temperature of −30° C. locally, which in comparison with a normal room temperature causes a more than adequate temperature change. Thus the described arrangement can be checked with simple and inexpensive means, so that no complex and expensive reading instruments or laborious test apparatuses are necessary to check the genuineness of the arrangement.

For example, if the temperature-dependent luminescent ink is printed in the form of a printing ink alone on a surface of the article, it may be used in practice as color reference for itself, since its color changes in the areas in which, for example, a local treatment with cold spray is applied. In the other areas, in which the cold spray does not act, the luminescent ink retains its first color location.

According to a preferred improvement, the arrangement comprises, moreover, a temperature-independent luminescent dye, which has a predetermined color location, which is matched to the first or second color location of the temperature-dependent luminescent dye and which forms a reference color for the first or second color location of the temperature-dependent luminescent dye. Particularly preferably, the two luminescent dyes are disposed on the component or integrated in the component in immediate proximity to or bordering one another, so that a comparison of the respective color locations can be achieved in the most direct manner possible.

Because a temperature-independent luminescent ink is provided in addition to the temperature-dependent luminescent ink, even slight temperature changes are able to cause a recognizable change in color location of the temperature-dependent luminescent ink. On the basis of the contrast between the different color locations, a color difference can be recognized more simply, especially in a transition region between the temperature-dependent and the temperature-independent luminescent dye, so that the temperature-independent luminescent ink contributes to a reliable and simple check of the originality of the arrangement.

The temperature-independent luminescent ink or the temperature-independent luminescent dye realizes a substantially static reference color for the variable temperature-independent luminescent ink. As regards the independence from temperature effects, the temperature-independent luminescent ink is formed such that, in a temperature range from approximately −30° C. to 21° C., for example, no change of the color location or of the associated dominant wavelength is recognizable within the scope of a currently customary measurement accuracy.

Preferably, the two luminescent dyes are disposed in direct proximity to one another on or in the component, so that, when a temperature change acts in the transition region, no continuous color variation is developed, as is possible, for example, due to a continuous temperature variation during the general use of the temperature-dependent luminescent ink.

An introduction and use of the temperature-independent luminescent ink as static reference color is particularly advantageous when the volume provided with the temperature-dependent luminescent ink or the area covered with the temperature-dependent luminescent ink is relatively small. By establishment of a temperature change, for example by means of spraying with a cold spray, the entire volume or the entire area is cooled from time to time.

Because the reference-providing luminescent ink is substantially temperature-independent, zero or only a very slight temperature-dependent change of the associated luminescence color location takes place. The color location of this reference luminescent ink is advantageously as identical as possible with the first color location, predetermined or formed at room temperature, of the temperature-dependent luminescent ink, so that uninitiated persons, including potential counterfeiters, are made aware to the least possible extent that two different luminescent inks are present. The genuineness is appraised by checking at room temperature that the first color location of the temperature-dependent luminescent ink coincides with the color location of the temperature-independent luminescent ink. Furthermore, it is checked whether the respective color locations of the two luminescent inks differ optically recognizably from one another upon treatment with a cold spray.

Possibly a person with criminal intent would attempt to counterfeit an arrangement or a label containing the described security feature by copying it. In doing so, the person would overlook that two different luminescent inks are present and in particular that a temperature-dependent luminescent ink has been processed. Accordingly, a copy of such an arrangement or of such a label would not have any temperature dependence of the color location and can therefore be recognized surely and reliably as counterfeit.

As an example, an adaptation of the respective color locations of the temperature-dependent and temperature-independent luminescent inks may be achieved as follows: In one step, the first color location of the temperature-dependent luminescent ink and the color location of the temperature-independent luminescent ink at room temperature are adapted to one another under ultraviolet illumination. Firstly two suitable luminescent inks are selected, the mixing line of which intersects the color location of the temperature-dependent luminescent ink. For example, luminescent inks with a dominant wavelength in the red and yellow region of the spectrum are selected when an orange first color location of the temperature-dependent luminescent dye is to be provided. In a further step, a specific mixing ratio of the selected luminescent inks is determined, at which the color location of the mixture corresponds to the first color location of the temperature-dependent luminescent ink. The prepared mixture then realizes the reference-providing temperature-independent luminescent ink.

The temperature-dependent luminescent ink is predetermined, for example, as an ink variant, to which temperature-independent fluorescent ink may be admixed if necessary, in order, for example, to display a different color location at room temperature. Such admixture does not change the temperature dependence of the temperature-dependent fluorescent or luminescent ink, but causes a shift of the color locations.

In a further step, an adaptation of the respective color locations at room temperature is carried out under normal light. As an example, the color location of the reference luminescent ink is adapted under D50 normal light to the first color location of the temperature-dependent luminescent ink under the same normal light. The temperature-dependent luminescent ink is usually formed less transparently or with less white content than customary temperature-independent luminescent inks. An adaptation of the respective color locations may be achieved by admixing a suitable white pigment with the reference luminescent ink. This may be done, for example, by addition of mixing white, which in this connection represents a suitable choice, since mixing white does not contain any optical brighteners in the form of blue luminescent inks, which would interfere with an adaptation of the respective color locations and achievement of a coincidence at room temperature under ultraviolet light.

In addition, it must be noted that an adaptation of the respective color locations at room temperature under normal light may lead to the situation that the respective color locations no longer coincide at room temperature under ultraviolet illumination. This situation may be the case, for example, even with use of mixing white and despite specification of a tolerance range for still-permissible deviations of the respective color locations, so that a coincidence is no longer fulfilled even within such a tolerance range and the respective color locations no longer coincide under ultraviolet light. In this case, it is expedient to conduct, in a further step, an iterative process, in which the respective color locations under ultraviolet light and normal light are alternately matched to one another at room temperature, until a desired coincidence is reached in both cases.

In addition, the respective color locations of the temperature-dependent and of the temperature-independent luminescent dye may be matched to one another in dependence on a predetermined viewing angle. The temperature-dependent fluorescence or luminescence has a different dependence on viewing angle than do customary fluorescent inks. Thus the described arrangement containing the temperature-dependent luminescent dye permits an additional possibility of authentication or inspection for genuineness. If the fluorescence color locations of the two fluorescent inks are matched to one another in perpendicular view, then a distinctly recognizable difference in color effect is observed in an oblique view deviating from the perpendicular view. Such a viewing-angle-dependent color effect can be appropriately described by means of a color intensity or saturation as a quantitative measure of the respective color. As regards different viewing of the respective fluorescent inks, the associated saturation may have a difference of 50%, for example, between the two fluorescent inks, so that, by tilting the arrangement or the label, it is possible to check in simple manner whether a temperature-dependent fluorescent ink is present.

According to an improvement, at least one luminescent dye is formed as the fluorescent dye. Preferably, both the temperature-dependent and the temperature-independent luminescent dyes are formed as fluorescent dyes. Alternatively, one or both luminescent dyes may be formed respectively as a phosphorescent dye. Within the scope of the present invention, it is possible to describe configurations and properties of the temperature-dependent and/or temperature-independent fluorescent ink in particular, although these may also be transposed to the generalized temperature-dependent and/or temperature-independent luminescent inks or luminescent dyes. For example, the luminescent dye is composed such that it can be excited to luminescence by means of the effect of ultraviolet radiation.

Particularly preferably, at least one luminescent dye is disposed on the component by means of printing or spraying. For example, the luminescent dye is composed as a printing ink or varnish, and it may cover a surface of the component partly or completely.

Advantageously, the component is formed optically transparently in a spectral region from the first color location up to and including the second color location of the temperature-dependent luminescent dye. In this way, the light emitted by the dye can leave the component in more or less loss-free manner, thus contributing to a reliable recognizability of the respective color location.

The component of the arrangement that comprises the luminescent dye or the luminescent dyes is realized, for example, as a part of a fiber, of a thermoplastic, of a paper element or of a label arrangement.

A further aspect of the invention relates to a label arrangement for a security label, which comprises a configuration of the arrangement described in the foregoing. The component of the arrangement is formed as a label layer and the temperature-dependent luminescent dye is disposed on a surface of the label layer or incorporated in the label layer. The label layer may be a paper-based or foil-based carrier or may realize one ply of a single-layer or multiple-layer label.

According to a preferred improvement, the label arrangement also contains the temperature-independent luminescent dye, which particularly preferably is disposed in proximity to or bordering the temperature-dependent luminescent dye on a surface of the label layer or is integrated into the label layer.

Preferably, at least one luminescent dye is printed or sprayed on the label layer at one or more predetermined positions having a predetermined geometry. In addition, it may be of advantage with regard to a realizable security label that the predetermined geometry of the temperature-dependent and/or of the temperature-independent luminescent dye comprises a predetermined dithering pattern. Such a dithering pattern may comprise an intentional positioning imprecision and/or a selectively formed tilting and contribute to an enhanced security of a security label or of the arrangement.

By means of the dithering pattern, a contribution is achieved to avoidance of anomalies due to two different fluorescent dyes being present. This feature relates, for example, to out-of-register flaws in connection with a printing process. By selective, random variation of the relative position of the two luminescent dyes relative to one another and/or a tilting relative to one another or relative to a center axis of the arrangement, a variation range is formed which may give the impression that only one ink was used. Suitable limits of such a variation range lie, for example, in the range of an out-of-register flaw of approximately ±0.1 mm and 1-2 degrees, so that the variation range preferably corresponds to the imprecision of typical ditherings. In this way, no systematic relationship in terms of a printed result, such as a label arrangement, is ever recognizable between the position and the tilting of the temperature-dependent fluorescent ink relative to the reference fluorescent ink.

According to an improvement, the label arrangement may comprise, in addition to the temperature-independent luminescent dye, a further temperature-independent, further or third luminescent dye. This further or third luminescent dye preferably also is disposed bordering the temperature-dependent luminescent dye on the label layer or is integrated into the label layer. The temperature-independent, second luminescent dye has a predetermined color location, which is matched to the first or to the second color location of the temperature-dependent luminescent dye and which forms a reference color for that location. The further temperature-independent luminescent dye also has a predetermined color location, which is matched to the other, i.e. to the second or first color location of the temperature-dependent luminescent dye and which forms a corresponding reference color for the respective color location.

In addition to the temperature-dependent security feature, the label arrangement may have one or more security plies or further security features, which offer a protection against manipulation or on the basis of which an attempted manipulation is obvious. Such further security features may be formed, for example, such that, in case of an unauthorized removal of the applied label arrangement from the labeled article, a label layer tears at particular positions.

A further aspect of the invention relates to an article having a configuration of the label arrangement, described in the foregoing, which is applied on the article. Using the label arrangement, the article can be labeled simply and securely, and reliable recognition of the originality of the labeled article is possible on the basis of the temperature-dependent security feature. As an example, the label arrangement realizes a self-adhering label, which comprises a carrier with printed temperature-dependent luminescent dye, which is provided on its underside with an adhesive layer, which permits an adhesive fastening of the label on the article and which, for example, is covered with a silicone paper before a use.

According to a further aspect of the invention, a method for the manufacture of a label arrangement for a security label comprises providing a label layer with an upper side and an underside as well as providing a temperature-dependent luminescent dye, which in a first state has a predetermined first color location and in a second state has a predetermined second color location different from the first color location. The method further comprises an application of the temperature-dependent luminescent dye on a surface of the label layer, so that the luminescent dye changes from the first into the second state in dependence on a temperature change acting on it and creates an optically recognizable color change from the first color location to the second color location.

In particular, the method may comprise, moreover, a provision of a temperature-independent luminescent dye, which has a predetermined color location, which is matched to the first or second color location of the temperature-dependent luminescent dye. According to such an improvement, the method further comprises an application of the temperature-independent luminescent dye on a surface of the label layer, preferably at a position adjacent to or bordering the applied temperature-dependent luminescent dye.

The described method is used in particular to manufacture one of the label arrangements described in the foregoing, so that all features and properties of the label arrangement, to the extent applicable, are also disclosed for the manufacturing method and vice versa.

Particularly preferably, the temperature-dependent luminescent dye and, to the extent intended, the temperature-independent luminescent dye are provided as printable or sprayable substance so that, during the method, the application of the at least one luminescent dye comprises a printing or spraying of the respective luminescent dye onto the surface of the label layer.

In particular, the two luminescent dyes can be matched to one another during the method, in order to realize a beneficial security feature for a security label and to contribute to a reliable recognition of the genuineness of the label arrangement and of the article provided therewith.

According to an improvement of the method, such an adaptation of the two luminescent dyes to one another may be achieved by the provision of the temperature-dependent and of the temperature-independent luminescent dye that comprises a formation of the first color location of the temperature-dependent luminescent dye at room temperature under ultraviolet light and a formation of the color location of the temperature-independent luminescent dye at room temperature under ultraviolet light. In this connection, the method further comprises an adaptation of the temperature-independent luminescent dye to the first color location of the temperature-dependent luminescent dye and a check of the respective color locations of the two luminescent dyes at room temperature under normal light. If it is found that the respective color locations under the respective light do not coincide within a tolerance range, the method further comprises an iterative matching of the respective color locations of the two luminescent dyes with one another at room temperature under normal light and under ultraviolet light, until a tolerable coincidence of the respective color locations under normal light and ultraviolet light is achieved.

In connection with the iterative matching of the respective color locations of the two luminescent dyes with one another, the color location of the temperature-independent luminescent dye can be changed selectively by admixing of a white color pigment with the temperature-independent luminescent dye. Such an admixing, for example of mixing white, may be performed until, within the scope of checking of the respective color locations of the two luminescent dyes at room temperature under normal light and under ultraviolet light, it is established that the color locations coincide sufficiently closely.

Moreover, the method for the manufacture of the label arrangement may also comprise yet another application of an adhesive layer on an underside of the label layer, to permit a simple and reliable fastening of the label arrangement on an article provided for the purpose. In addition, the label arrangement may also be provided with even further layers or plies, such as a protective foil, for example, which protects an applied inscription or printing from external influences and dirt. As an example, within the scope of the manufacturing method, the individual plies and layers may be provided in a manner disposed on one another and coupled with one another.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIGS. 5A and 5B show a schematically simplified example of a first, temperature-dependent luminescent substance, the luminescence spectrum of which comprises two spectral lines with inverse temperature-dependent intensities, FIGS. 6A and 6B show a measured luminescence spectrum of a temperature-dependent luminescent substance with inverse temperature-dependent intensities of two spectral lines at 550 nm and 625 nm and FIG. 7 shows a tabular listing of the designations used for the respective color locations of the first, second and third luminescent substances in dependence on the illumination and the temperature.

DETAILED DESCRIPTION OF PREFERRED EMBODIMENTS

Elements of like construction or function are marked throughout the figures with like reference symbols. For reasons of clarity, the illustrated elements may not be marked with reference symbols in all figures.

Figure 1A:
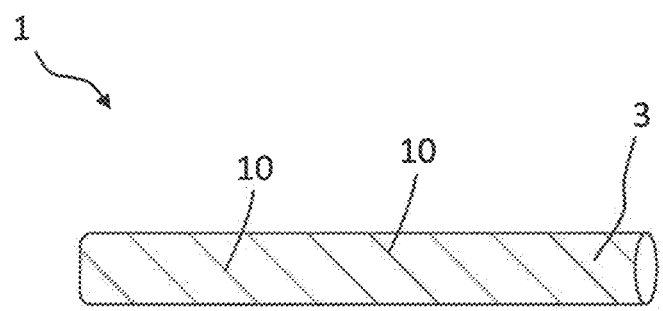
FIGS. 1A-1C show an exemplary embodiment of an arrangement having a temperature-dependent security feature.
Figure 1B:
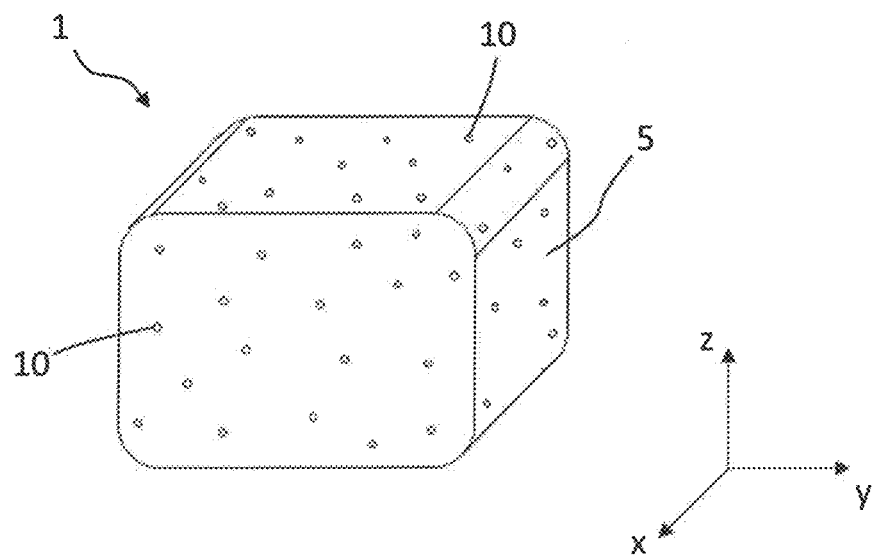
Figure 1C:
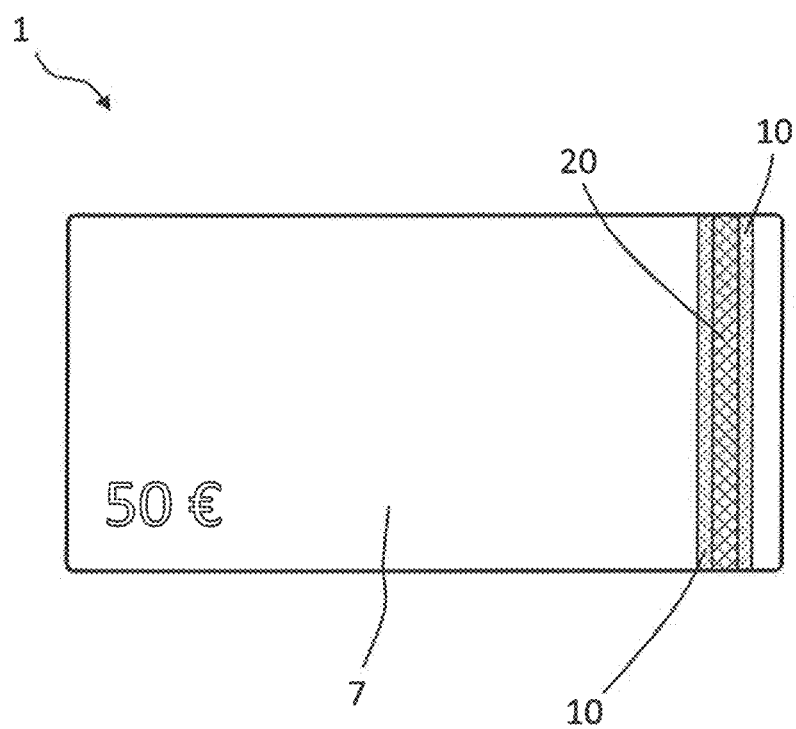

FIGS. 1A to 1C schematically show an exemplary embodiment of an arrangement 1 having a temperature-dependent security feature, which is realized by means of a temperature-dependent first fluorescent dye 10 or fluorescent ink 10. The arrangement 1 comprises respectively a component 3 (see FIG. 1A), 5 (see FIG. 1B), 7 (see FIG. 1C) or 110 (see FIGS. 2A-2F) and a temperature-dependent luminescent dye, which is realized, for example, as fluorescent dye or fluorescent ink 10. In a first state, the temperature-dependent fluorescent ink 10 has a predetermined first color location and in a second state has a predetermined second color location different from the first color location. The temperature-dependent fluorescent ink 10 is disposed on component 3, 5, 7 or 110 or is integrated in component 3, 5, 7 or 110 in such a way that it changes its state from the first into the second state in dependence on a temperature change acting on it and in doing so creates an optically recognizable color change from the first color location to the second color location.

FIG. 1A illustrates the component as a fiber 3, which is provided with the temperature-dependent fluorescent ink 10 in the form, for example, of a dyed, simultaneously processed thread. Alternatively, the fiber 3 is provided, for example, on a surface containing the temperature-dependent fluorescent ink 10. FIG. 1B illustrates the component as a thermoplastic 5, which can be manufactured as a molded plastic part during an injection-molding process. The temperature-dependent fluorescent ink 10 is admixed, in the form of a large number of thermochromic color pigments, for example, with a raw material to form the thermoplastic 5 and in this way is integrated in the molded plastic part. FIG. 1C illustrates the component as a paper element 7, which realizes a banknote, for example, which is provided not only with the temperature-dependent fluorescent ink 10 in the form of two strips but also with a strip situated in between and formed from a temperature-independent luminescent and especially further fluorescent dye 20.

The temperature-independent fluorescent dye 20 (hereinafter also referred to occasionally as fluorescent ink 20) has a predetermined color location, which is matched to the first or the second color location of the temperature-dependent fluorescent dye 10. The temperature-independent fluorescent ink 20 forms a static reference color for the first or second color location of the temperature-dependent fluorescent dye 10 and is disposed on the component or integrated in the component, preferably bordering or in the immediate proximity of the temperature-dependent fluorescent dye 10, so that a comparison of the respective color locations can be achieved in the most direct manner possible.

By means of the fluorescent dye 10, a temperature-dependent security feature can be realized in or on an article, in order to permit a simple and reliable check of a genuineness of the article. This article comprises at least the described component 3, 5, 7 or 110, which is formed, for example, as a fiber 3, paper element 7 or label layer 110.

The first state represents a state with a first temperature of the arrangement 1 or of the temperature-dependent fluorescent dye 10, in which this state has the first color location. For example, in the first state, the first color location is defined at standard ambient or room temperature. The second state represents a state different from the first state, for example at a negative Celsius temperature, at which the temperature-dependent fluorescent ink 10 has the second color location, which differs distinctly recognizably from the first state and the first color location.

FIGS. 2A to 2F show exemplary embodiments of a label arrangement 100 having a label layer 110, on which or in which the temperature-dependent fluorescent ink 10 as well as a temperature-independent fluorescent ink 20 are applied or incorporated. The fluorescent inks 10, 20 are preferably composed as printable substances and may be applied during a printing process at one or more predetermined positions and with predetermined geometry on the arrangement 1 or the label layer 110. Suitable printing processes include, among others, a flexographic printing, a screen printing (for example as flat bed as well as rotary), an offset printing and an inkjet printing.

The predetermined geometry comprises, for example, a predetermined script, which is formed with the respective fluorescent ink 10 or 20. According to FIG. 2A, respectively one row of the illustrated script containing the temperature-dependent fluorescent ink 10 is configured in alternation with one row containing the temperature-independent fluorescent ink 20. The temperature-independent fluorescent ink 20 forms a reference fluorescent ink adjacent to the temperature-dependent fluorescent ink 10.

Figure 2A:
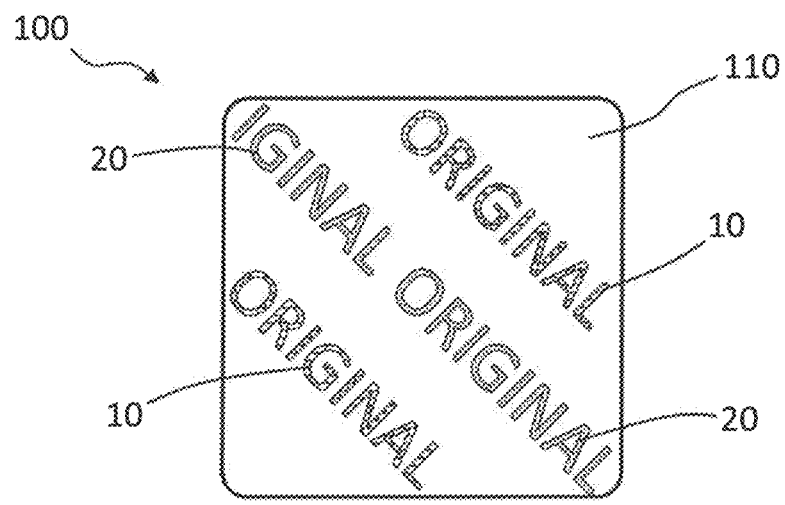
FIGS. 2A-2F show various exemplary embodiments of a label arrangement for a security label.
Figure 2B:
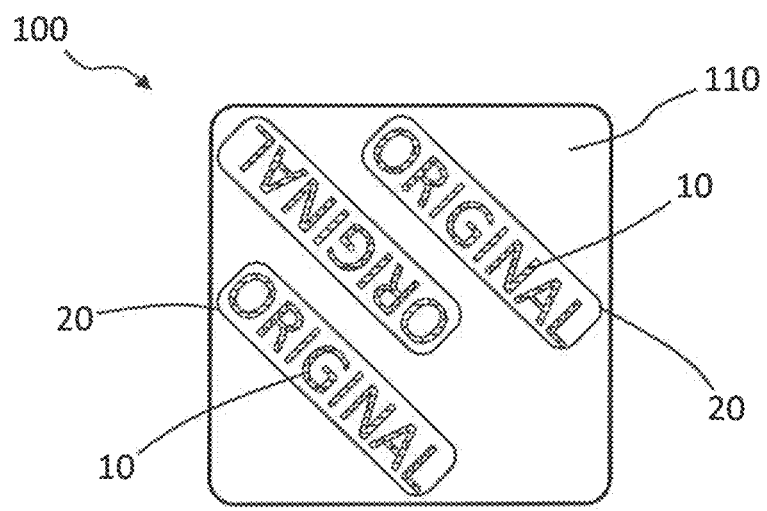

FIG. 2B illustrates a further exemplary embodiment of the label arrangement 100, in which the illustrated scripts respectively containing the temperature-dependent fluorescent ink 10 are formed and respectively surrounded by a frame, which is configured with the temperature-independent fluorescent ink 20.

Figure 2C:
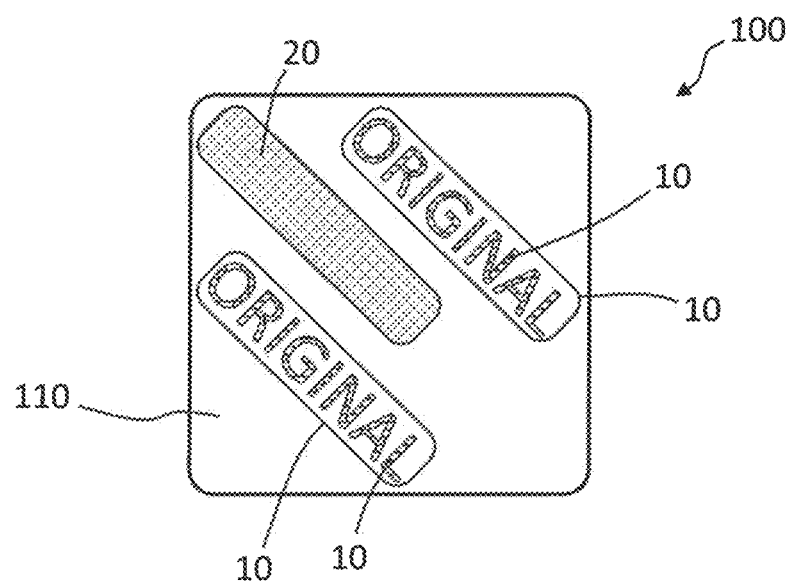

FIG. 2C shows a further exemplary embodiment of the label arrangement 100, in which the illustrated scripts and the frames surrounding them are formed with the temperature-dependent fluorescent ink 10. Between a respective row of scripts, a bounded area containing the temperature-independent fluorescent ink 20 is configured as the reference color.

Figure 2D:
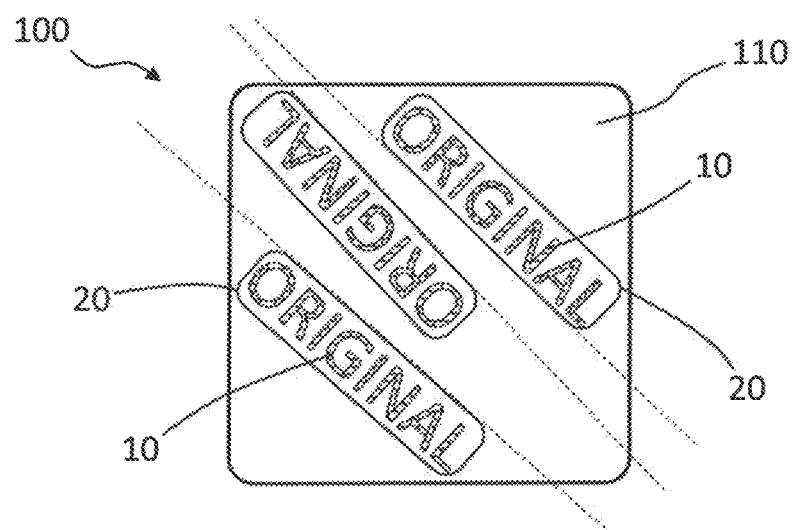

FIG. 2D shows a further exemplary embodiment of the label arrangement 100, in which the two fluorescent inks 10, 20 are applied with a predetermined dithering pattern on the label layer 110. Such a dithering pattern may make a contribution to avoidance of anomalies because two different fluorescence colors 10, 20 are present during a printing process. By selective, random variation of the relative position of the two fluorescent dyes 10, 20 relative to one another and/or incorporation of a tilting relative to one another, a variation range is formed that may give the impression that only one ink was used. These selectively incorporated imprecisions correspond to the example of a typical dithering, which usually exists during a printing process.

Figure 2E:
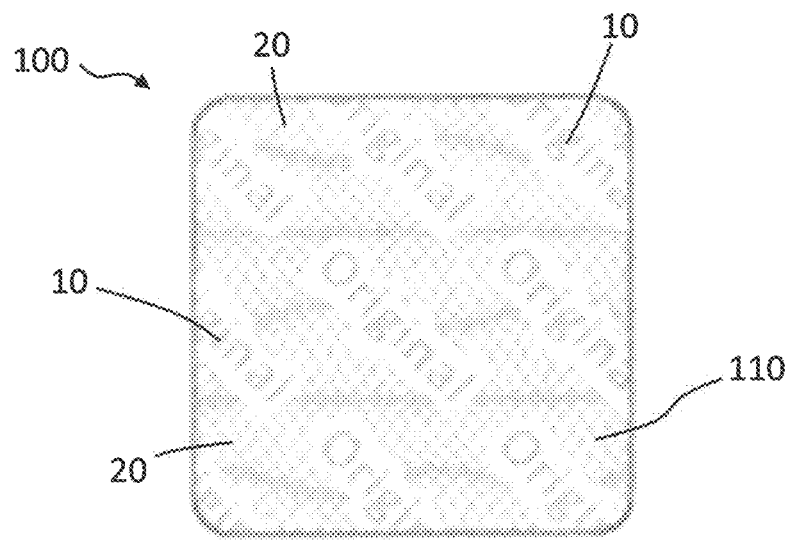
Figure 2F:
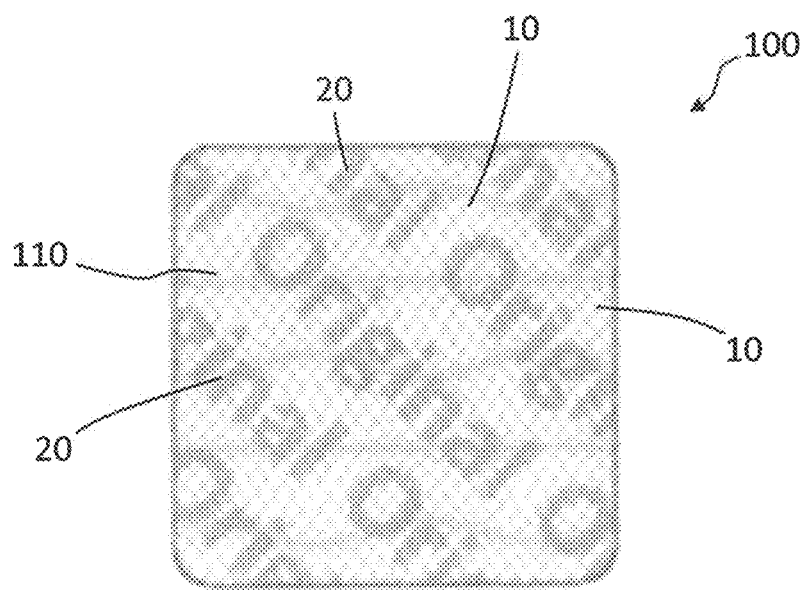

FIG. 2E shows a further exemplary embodiment of the label arrangement 100, in which the illustrated scripts are formed with the temperature-dependent fluorescent ink 10, while the temperature-independent fluorescent ink 20 is composed in the form of a predetermined pattern on or in the label layer 110 and fills intermediate spaces between the scripts. In FIG. 2F, the predetermined pattern according to FIG. 2E is formed by means of the temperature-dependent fluorescent ink 10 and the scripts are printed by means of temperature-independent fluorescent ink 20, for example over the pattern and the fluorescent ink 10.

Figure 3A:
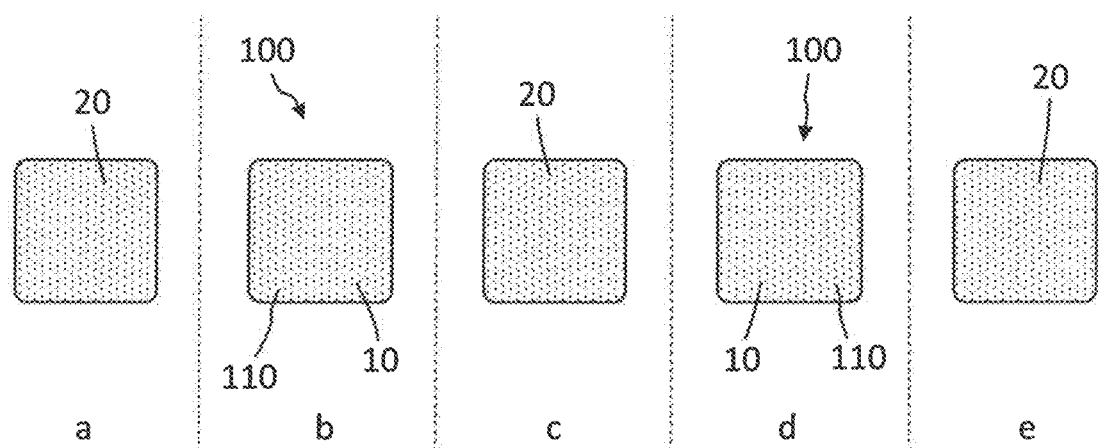
FIGS. 3A-3D show a proposed temperature-dependent security feature using a viewing-angle dependence.
Figure 3B:
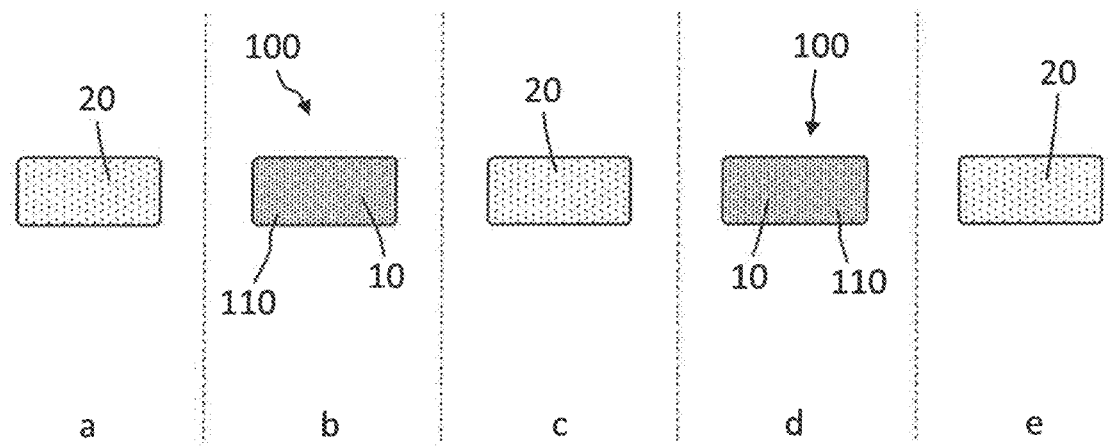

FIGS. 3A to 3B illustrate a viewing-angle dependence of the fluorescent inks 10, 20 being used. This viewing-angle dependence may be optimized for the purpose of further verifying a presence of the described security feature with the temperature-dependent fluorescent ink 10. The respective color locations of the temperature-dependent and of the temperature-independent fluorescent dyes 10, 20 have a different dependence on a viewing angle under which the respective areas are observed. If the respective fluorescence color locations of the two fluorescent inks 10, 20 are matched to one another in perpendicular view, for example (see FIG. 3A), then a recognizable difference in color effect (illustrated as a denser dot structure) is observed in an oblique view (see FIG. 3B) deviating from the perpendicular view.

Figure 3C:
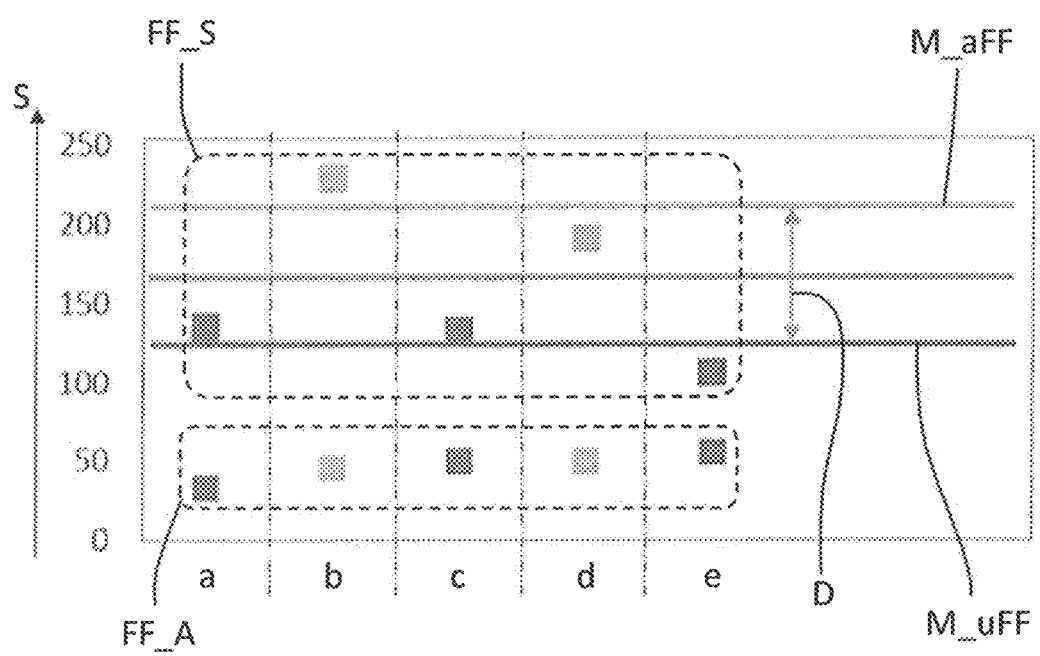

FIG. 3C represents such a viewing-angle-dependent color effect in a diagram in which a saturation S of the fluorescence colors, as a quantitative measure of the color effect, is entered for the various arrangements or patterns a to e with a respective fluorescent ink, which are illustrated in FIGS. 3A and 3B and which alternately show the static, temperature-independent fluorescent ink 20 and the variable, temperature-dependent fluorescent ink 10. The illustrated color parameter of saturation S is averaged for the perpendicular view and oblique view respectively via 128 pixels times 128 pixels and via 64 pixels times 64 pixels respectively. On the basis of FIG. 3C, it can be seen that the color intensity or the saturation relative to the perpendicular view FF_A does not show any substantial difference of the respective fluorescent inks 10, 20 relative to one another, whereas, in the oblique view FF_S, distinct differences in this regard can be read between the two fluorescent inks 10, 20. Relative to an averaged saturation M_aFF for temperature-dependent fluorescent colors or inks 10 and an averaged saturation M_uFF for temperature-independent fluorescent colors or inks 20, a difference D of approximately 50% of the saturation of the fluorescence colors can be inferred from the diagram in FIG. 3C.

Figure 3D:
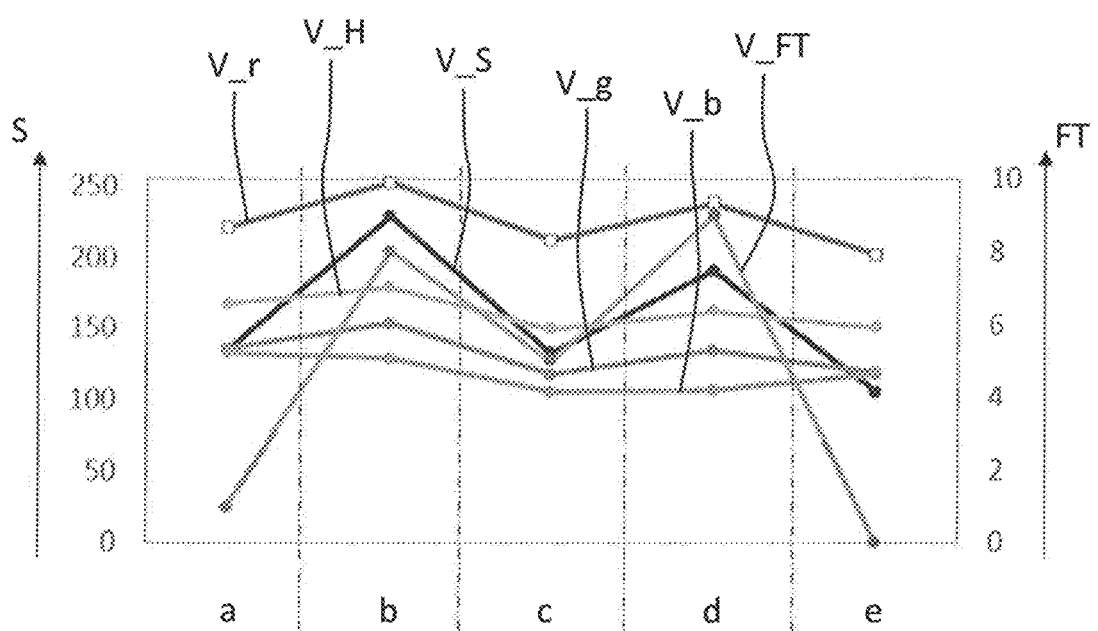

FIG. 3D shows the color parameter of saturation S for the patterns a to e averaged via 64 pixels times 64 pixels and illustrated for the oblique view according to FIG. 3B. The individual profiles show: V_r corresponds to the profile relative to the red color component of the respective fluorescent ink 10, 20; V_g corresponds to the profile relative to the green color component of the respective fluorescent ink 10, 20; V_b corresponds to the profile relative to the blue color component of the respective fluorescent ink 10, 20; V_H corresponds to the profile of a lightness of the respective fluorescent ink 10, 20; V_S illustrates the profile of the saturation S of the respective fluorescent ink 10, 20; and V_FT shows the profile of a hue FT of the respective fluorescent ink 10, 20.

The described exemplary embodiments permit, by means of a temperature-dependent fluorescent ink 10, a hidden and reliable inspection of the genuineness of an article that comprises the arrangement 1 or the label arrangement 100.

According to the exemplary embodiments of FIGS. 1C to 2F, the security feature is provided with different fluorescent inks 10 and 20, which have at room temperature, for example, a color location that is as identical as possible. After a cold treatment, for example by means of a cold spray, the color location of the temperature-dependent fluorescent ink 10 changes distinctly, so that, in comparison with the temperature-independent reference ink 20, a difference in the associated color locations is read in particularly simply recognizable manner for the user during the genuineness inspection.

Figure 4:
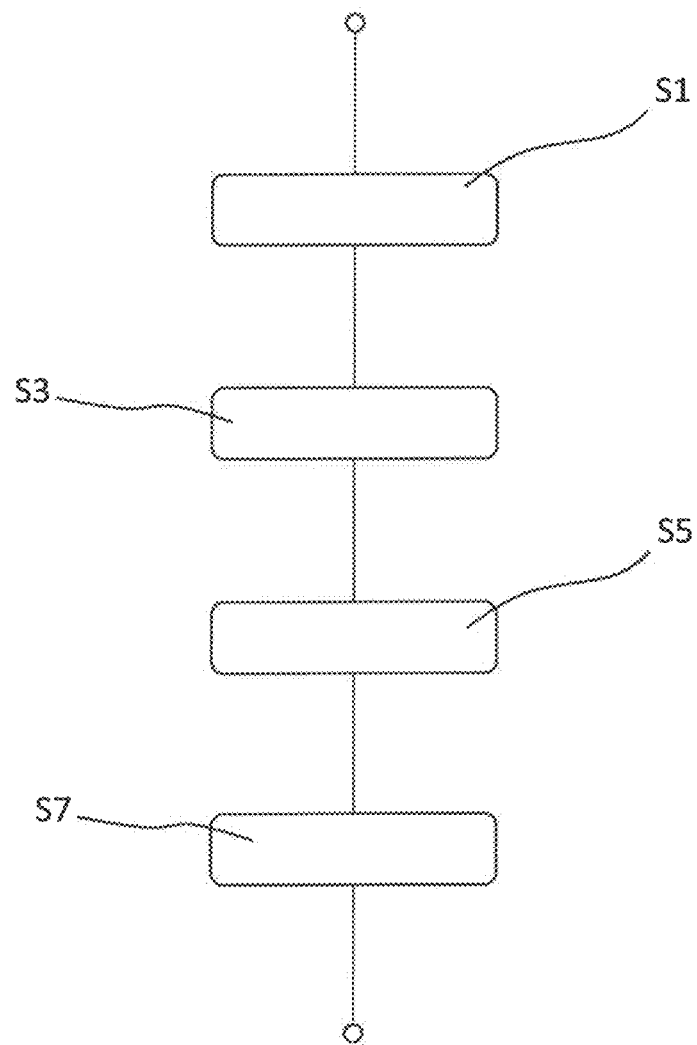
FIG. 4 shows an exemplary embodiment for a flow diagram for the manufacture of a label arrangement for a security label.

FIG. 4 represents an exemplary embodiment of a flow diagram for a method for the manufacture of the label arrangement 100 or of a material web, which permits a fabrication and/or application of a large number of label arrangements 100.

In one step S1, for example, a carrier or a material web comprising the label layer 110 is prepared.

In a further step S3, the temperature-dependent and the temperature-independent fluorescent dyes 10 and 20 are provided, by first comparing the respective color locations of the two fluorescent inks 10, 20 with one another under ultraviolet light at room temperature.

In a still further step S5, the respective color locations of the two fluorescent inks 10, 20 are also compared with one another under normal light and, if no tolerable coincidence exists, the respective color locations of the two fluorescent inks 10, 20 are iteratively matched to one another. Such a matching is carried out, for example, by admixing of mixing white with the static reference fluorescent ink 20, so that the two fluorescent inks 10, 20 show, at room temperature under normal light, a substantially identical degree of whiteness in the visible spectrum. In the process, the iterative adaptation comprises a control of the respective color locations at room temperature under ultraviolet light.

If the two fluorescent dyes 10, 20 are formed in a manner matching one another in terms of their respective color locations, they can be prepared in a further step S7 as printable substance and printed on the label layer 110. To increase the security against counterfeiting, the position and a tilting of the two fluorescent inks 10, 20 can be formed in selectively varied manner in the security feature.

By the introduction of the additional fluorescent ink 20 as reference color with a temperature-independent color location of the fluorescence and the positioning of this reference fluorescent ink 20 in direct spatial proximity to the temperature-dependent fluorescent ink 10, a particularly reliable color comparison of the two fluorescent color locations relative to one another is made possible. In addition, the temperature-independent fluorescent ink 20 offers the advantage that a reference color is always available for comparison with the temperature-variable color location of the temperature-dependent fluorescent ink, so that, for a color comparison, for example, the positions at which the label arrangement 100 is treated with a cold spray are not critical. This lack of criticality is particularly advantageous when the area printed with the temperature-dependent fluorescence is small and the entire area is cooled from time to time with the cold spray.

It is of advantage in particular that the two fluorescent inks are matched to one another in terms of their respective color locations, because in this way it is possible to avoid the situation that a use of two different fluorescent inks is obvious. Because it is not obvious that two different printing or fluorescent inks are present, the predetermined printed pattern would be simulated only by a single printing ink in connection with a copy by an uninitiated person, and so an inventive inspection of the genuineness of the temperature-dependent security feature would not be possible and thus a perpetrated manipulation would be immediately obvious.

According to the illustrated exemplary embodiments, the inks used are described as temperature-dependent and temperature-independent fluorescent printing inks 10, 20, but alternatively phosphorescent inks or more generally luminescent inks having the corresponding properties may also be used. In this connection, the energy supplied for luminescence in the form of photon radiation may initiate an activation process and bring about prompt fluorescence, which can be excited, for example, by means of a commercial UV lamp. As regards phosphorescence, the incident photon radiation will generate an excited state, so that the photon energy is frozen or stored for a certain time and subsequently emitted by the phosphorescent ink.

A supply of energy in the form of photon radiation for excitation of the fluorescence or luminescence may take place, for example, by means of photons in the visible region of the spectrum or in a wavelength region contiguous with this. Beyond this, an excitation by means of x-rays and alternatively electromagnetic radiation is also conceivable, in order to excite corresponding luminescent inks to light emission.

Moreover, alternatively or additionally to exposure to photon radiation, an energy to be supplied for excitation of a luminescence may also be provided by other processes at a suitable distance. For example, energy due to chemical reactions or by means of mechanical action, for example in the form of frictional energy or impingement of sound waves, may be supplied to the arrangement 1 or to the label arrangement 100, provided the luminescent inks are set up for such an energy supply. Alternatively or additionally, energy may be supplied by dissolution of crystal structures in water or by action of incident particles, such as alpha particles or electrons, for example, which transfer part of their kinetic energy to the particles of the fluorescent dye or dyes 10, 20.

The fluorescent inks 10, 20 can be excited in particular by means of ultraviolet light, or alternatively fluorescent or luminescent inks may also be used that can be excited in other regions of the spectrum to emit light in the visible spectrum. For example, the luminescent inks may be formed as so-called "upconverters", which can be excited by means of a laser pointer emitting in the near infrared region and emit light in the optically visible spectrum.

Moreover, it is possible to use luminescent inks for which the temperature-dependent difference in terms of the respective color locations can be inspected in wavelength regions other than the optically visible spectral region. Instead of comparing the reference fluorescent ink 20 with the temperature-dependent fluorescent ink 10 in the visible wavelength region, it is possible to use, for example, luminescent inks that emit light or radiation in the near infrared region from approximately 800 nm to 1000 nm. A corresponding sensor system, for example in the form of an infrared (IR) sensor or an IR camera, is then beneficial for detection.

In addition, a matching of the respective color locations of the temperature-dependent and of the temperature-independent fluorescent dyes 10, 20 may also be achieved under other conditions. Instead of adapting the color location of the reference fluorescent ink 20 to the first color location of the temperature-dependent fluorescent ink 10 at room temperature under UV illumination, it is possible to adapt the respective color locations to one another at cold temperatures, for example corresponding to a treatment with cold spray. For example, if two different fluorescence color locations are needed for an application at room temperature, the temperature-dependent fluorescent ink 10 and the temperature-independent fluorescent ink 20 can be used in order to represent the associated fluorescence color locations and to achieve authentication of the genuineness of the label arrangement 100 via a coincidence of the respective color locations at cold temperatures.

In order to increase the security of the label arrangement 100 further, it is possible, besides the introduced reference fluorescent ink 20, the color location of which is, for example, identical to the first color location of the temperature-dependent fluorescent ink 10 or coincident therewith at least within a tolerance range, to introduce a further, second temperature-independent reference ink, the color location of which is then identical to the second color location of the temperature-dependent fluorescent ink 10 at cold or low temperatures or is coincident therewith at least within a tolerance range.

Moreover, it may be possible to use luminescent inks according to the described arrangement 1 or the described label arrangement 100 in which a difference between associated color locations is not necessarily due to a change of the temperature but instead can be initiated in general by a physical or chemical mechanism of action. For example, fluorescent or luminescent dyes may be used in which a change of state and a change of the color location can be initiated by wetting with water or chemicals, by incident flow of carbon-dioxide-containing (breathing) air or other gases, by variation of the air pressure or another effect of force, which, by change of lattice constants, for example, is able to lead to a color change.

As an example, the temperature-dependent fluorescent ink 10 may be integrated directly in a fiber 3 or a thermoplastic 5, as illustrated in FIGS. 1A and 1B. As an example, the temperature-dependent fluorescent ink 10 is admixed with an associated raw material during a manufacture of the end product, which according to the illustrated exemplary embodiments in FIGS. 1A and 1B is realized as a fiber 3 or thermoplastic 5, so that the anti-counterfeiting feature used for the inspection of the genuineness is contained in the finished end product. Further possible end products containing a temperature-dependent security feature can be realized as composite material, thermosetting plastic, as elastomer, as paper element (see FIG. 1C) or a foil element.

In this connection it is particularly advantageous for the respective material being used to be formed transparently in the wavelength region in which a color change of the temperature-dependent fluorescent ink 10 is established, because then the color change caused due to the temperature-dependent fluorescent ink 10 is particularly distinctly recognizable.

Alternatively, the temperature-dependent fluorescent ink 10 may be worked into a feature carrier, which may be subsequently applied on diverse surfaces or respectively incorporated in diverse materials or in articles. Such a carrier may be, for example, a sprayable liquid, an adhesive, a lacquer, an ink, a fiber, an aerosol or a composite material. Methods for application may be, for example, printing, spraying, dipping or embossing. A manufacture of such a security feature in or on a label arrangement 100 can be achieved according to the flow diagram of FIG. 4.

Especially in combination with the temperature-independent reference fluorescent ink 20, the temperature-dependent fluorescent ink 10 permits a reliable and secure inspection of the genuineness of an article and contributes to an enhanced security level of the article. The described security feature of the fluorescence can be read and checked simply and inexpensively by means of a commercial ultraviolet (UV) lamp at approximately 365 nm. Such a UV lamp is used and widely known for banknote inspection among other purposes, and is therefore also available as a detector for the inspection of the described security feature. This availability and the corresponding routine in the handling of such devices additionally act beneficially on configurations of the described security feature.

In addition to the check of the genuineness of the security feature by means of a UV lamp, a further temperature-dependent stage of the verification exists by means of a commercial cold spray. In this way an inspector is made able to detect a change of the color location of the temperature-dependent fluorescent ink 10 with the least possible doubt. Even slight temperature changes in the transition region can be made clearly visible by the contrast with the static fluorescent ink 20. One objective of such an inspection is to obtain an indication of the genuineness of the article on which the fluorescent inks 10, 20 are applied or in which the fluorescent inks 10, 20 are incorporated.

For example, the fluorescent inks 10, 20 may be printed directly on an article, in order to mark its genuineness, for example a paper element (see FIG. 1C), a foil element, a cardboard element, a fabric element, a glass element, a leather element, a wood element, a ceramic element, a metal element, a foil packaging, a blister, a folding box, a plastic bottle, a banknote (see FIG. 1C), a timepiece, a tool or another instrument. In particular, the fluorescent inks 10, 20 may be printed on a label or processed in a label arrangement 100, for example according to the illustrated FIGS. 2A to 2F, so that an article can be distinguished in order to mark its genuineness.

Moreover, it is possible to use, for the temperature-independent fluorescent ink 20, several reference fluorescent inks, for which a respective color location is formed in predetermined manner, for example by matching to the variable color location of the temperature-dependent fluorescent dye 10 in temperature steps of 10° C. In this way, the reference fluorescent inks form a reference scale, which is additionally printed out simultaneously, for example, so that the inspector will be able to identify, on the basis of the matching reference color, a current temperature range in which the security feature will be checked.

In addition, the fluorescent inks 10, 20 may be applied on products that must be stored below −25° C. A verification of the genuineness and documentation of the finding, such as a color or a pattern, for example, is then used simultaneously for the documentation of whether the product was tested in the cooled state or at room temperature.

The label arrangement 100 can be formed in single-layered manner and, for example, may be provided with the label layer 110 as a foil-based security feature. Alternatively, the label arrangement 100 is formed in multiple-layer manner and is provided, for example, with additional plies for inscription or for formation of further security features. Moreover, the label arrangement 100 may be provided on an underside with an adhesive, which is applied during the manufacturing process, for example, and is covered with silicone paper for a later use.

In addition, the manufactured label arrangement 100 may be applied on an article in a further step of the method or in a separate process. In this way, mechanical application of the label arrangement 100 is also possible, for example, so that a reliable and secure attachment of a respective label arrangement 100 to a large number of articles is possible.

In all exemplary embodiments mentioned hereinabove or claimed hereinafter, it is possible selectively to provide a first dye 10 luminescing in temperature-dependent manner, preferably additionally also a second luminescent dye 20, the luminescence of which is not temperature-dependent, and optionally yet a third luminescent dye 30, the luminescence of which is likewise not temperature-dependent. In daylight, the first luminescent dye has an appearance, especially a color, that corresponds to a first color location F1'. The color locations of the second and third luminescent dyes 20 and 30 in daylight are F2' and F3' respectively (see FIG. 7). These color locations F1', F2' and F3' (in daylight; i.e. without effect of UV radiation) are temperature-independent.

The color locations of the second and third luminescent dyes 20 and 30 under the effect of UV radiation (instead of daylight), i.e. the color locations of the emission spectrum of the luminescent dyes 20 and 30 in question, are usually different from the color locations in daylight; they are denoted here by F2 and F3 respectively and do not depend on the temperature. In contrast, the first luminescent dye 10 has, under UV irradiation, an emission spectrum wherein the color location varies with the temperature; the color location of its emission spectrum at a first temperature F1a (for example, at room temperature) is different from that F1b at another, second temperature (for example 0° C., −20° C. or −40° C.); for temperature change in between, the color location in between varies continuously (i.e. steadily and not abruptly).

An emitted luminescence spectrum, i.e. phosphorescence or fluorescence spectrum, may be composed of sharp peaks at particular wavelengths and/or of continuous wavelength regions, over which a distinct intensity is detectable. A color location, to which the color impression of the emitted spectrum perceived by the human eye corresponds, can be associated with a luminescence spectrum. Such a color impression may be sensed with the naked eye or instrumentally (e.g. with a detector, which imitates the perception of the human eye). In both cases, a color impression that the emitted spectrum generates for the human eye can be observed or instrumentally determined. This color impression corresponds to a color location that comprises the hue, preferably even the color saturation also and/or the lightness.

The color location may be sensed and printed out with any common standard system for normalization of colors. Once again, a particular (average) wavelength, which reproduces that color which the human eye perceives as the color of the luminescent radiation, may be associated with the hue. Even if a luminescent substance does not emit any radiation whatsoever at precisely this wavelength, such a (an average) wavelength can be determined, because the human eye integrates the radiation intensities (with corresponding weighting according to the sensitivity of the rods for the color vision) over the visible wavelength region. For example, the emission spectrum may have peaks at two wavelengths, whereas the color impression corresponds to a third wavelength that lies between these two wavelengths, even though no radiation was emitted at precisely this third wavelength.

As illustrated schematically in FIGS. 5A and 5B, it is preferably provided that, as the first luminescent dye 10, one such is used that has at least two peaks at particular wavelengths L1 and L2 in its emitted spectrum; in particular, one such luminescent substance for which the emitted intensity I at L1 and that at L2 depend inversely on the temperature. As a result, with temperature changing from T1 to T2 (for example in case of temperature drop or of temperature falling from T1 to T2), the intensity of the luminescent radiation at L1 decreases, while simultaneously the intensity of the luminescent radiation at L2 increases. With such a luminescent substance, the spectrum of which emitted under UV irradiation exhibits such an inverse temperature-dependent change of the radiation intensity of two spectral lines or wavelengths L1, L2, a particularly pronounced and distinctly recognizable color change of the color location (or of the average wavelength associated with that color location) of the luminescence spectrum can be realized, which in particular can be used to form a security feature that can be checked rapidly and simply with the naked eye. Thus it is possible, by UV irradiation and spraying with a cold spray, to check whether the perceived luminescence color F1a of a first luminescent substance 10, upon cooling to a colder (e.g. at least by 20, 40 or 60 degrees) temperature (especially in comparison with room temperature of 21° C.), remains the same or is changed, in particular shifts to a distinctly different color location F1b, the associated wavelength of which deviates, for example, by more than 15 nm or 30 nm (depending on embodiment, by up to more than 45 nm) from the wavelength of the color location of its luminescence spectrum (of the luminescent substance 10) perceived at room temperature. Even the continuous transition between two perceived average or corresponding wavelengths is perceptible, for example when the luminescent substance 10 gradually approaches room temperature once again after spraying with a cold spray.

FIGS. 6A and 6B show a measured luminescence spectrum of a temperature-dependent fluorescent substance 10, the emitted spectrum of which has, among others, two local maxima at two special wavelengths L1=550 nm and L2=625 nm, which were already illustrated in schematically simplified manner in FIGS. 5A and 5B. At room temperature, the intensity at 625 nm predominates over that at 550 nm; to the human eye, the luminescent substance appears in the color orange-red under UV light at room temperature. In contrast, in the case of temperature lowering to −40° C., the emitted intensity at L1=550 nm increases distinctly, while that at L2=625 nm has greatly declined; in particular, the relative ratio of the two intensities is quite perceptibly inverted via the temperature difference; at −40° C., the luminescent substance now appears in the color green. In the temperature interval in between, the change of the two intensities takes place continuously, i.e. without abrupt changes around particular temperatures. Thus the shift of the luminescent color or average wavelength sensed by the human eye amounts, for example, to less than 5 nm per temperature change by five degrees Celsius; independently of the temperature starting from which this temperature change takes place. In other respects, the intensities I in FIGS. 5A to 6B are plotted in arbitrary relative units.

For more distinct color control of the color of the first luminescent substance, a second and possibly also a third luminescent substance 20 and 30 may be provided, the luminescence spectra of which do not depend on the temperature and which are used as reference color areas for the color locations F1a and F1b, observed at the temperatures T1 and T2, of the first luminescent substance.

As material for the luminescent substance 10 of FIGS. 5A to 6B, in which the color location of its spectrum emitted under UV irradiation is supposed to shift as distinctly as possible during a temperature change (especially due to inverted intensity change of the radiation intensities of two spectral lines with the temperature change), it is possible to use oxinates, for example, or substances or compositions containing metalloorganic complexes.

Selection and mixing ratio of these substances can be optimized on the basis of the measured luminescence spectra; even distinctly larger shifts of the color location of the luminescence spectra (in dependence on the temperature) can often be observed, e.g. changes of the color location in which a shift of the average wavelength (i.e. that sensed on the whole by the human eye) by 45 nm or even 50 nm, and/or shifts of the color location that can be observed over even larger temperature intervals of up to more than 50 or 60 degrees temperature change; the latter may amount, for example, to 0.5 nm to 1.2 nm per one degree of temperature change over the entire temperature interval.

With oxinates, color shifts between orange (or orange-red) and green can be realized, for example, overtemperature differences between 21° C. and −40° C.; even the much smaller color shifts in the case of temperature changes by only 20 degrees are still so distinctly recognizable by the human eye (possibly with one or more comparison color areas 20, 30 of luminescent substances with temperature-independent luminescence spectrum), so that any person is already able to determine rapidly and unequivocally after brief technical instruction whether the genuine inspection dyes used during manufacturing are present or a counterfeit copy is present, the dyes of which either do not luminesce at all or in which the first luminescent dye 10 does not in any case exhibit the predicted color change of its luminescent ink in the case of temperature change, especially cooling.

Heretofore, a use of the above-mentioned materials and compositions that exhibit such a distinctly perceptible color shift of the luminescence spectrum that it is recognizable by the human eye even without optical detection instruments, and the use thereof for a security feature of a label or of another article have not been known. Thus it will be possible in future to check the genuineness or authenticity, for example of a label or of a labeled article or container, by means merely of a cold spray and of a commercial UV radiation source; measuring instruments that may be conventionally necessary for sensing the spectral distribution of the luminescence spectrum (and its temperature-dependent change) may be dispensed with in future. In other respects, preferably such luminescent substances are used that are nonmagnetic, i.e. cannot be magnetized, and in which the direct temperature change already causes a shift of the color location of its luminescent radiation without involving magnetic effects.

Finally, FIG. 7 shows in tabular form the designations and abbreviations used for the color locations of the respective luminescent substances 10, 20 and 30. The color locations in daylight that are in temperature-independent manner, i.e. without effect of UV radiation, are presented in the second row. Those for UV illumination at room temperature appear in the next-to-last row and those for UV illumination at −40° C. in the last row. The luminescent substances 10, 20 can be iteratively optimized in such a way that not only in daylight are their colors or color locations F1' and F2' not distinguishable by the human eye, but neither are the color locations of their luminescence colors F1a and F2 at room temperature. It is only by cooling (even by temperature intervals that are already far smaller; e.g. only down to 0° C.) that it is possible to detect whether a color difference has developed between the color locations F1b (instead of F1a beforehand) and the reference color F2 that has remained identical; the color F1b is distinctly different from the previous F1a of the first luminescent substance 10, whereas the luminescent substance 20 luminesces in temperature-independent manner, i.e. once again according to the same color location F2. If yet a third luminescent substance 30 is used, its color location F3 will preferably be adapted to that F1b of the first luminescent substance 10 at a second, lower temperature (e.g. 0° C., −20 C or −40° C.), and optionally its color location F3' in daylight will be additionally adapted to that F1' of the first luminescent substance 10 in daylight.

Although only a few embodiments of the present invention have been shown and described, it is to be understood that many changes and modifications may be made thereunto without departing from the spirit and scope of the invention.

What is claimed is:

1. An arrangement comprising:
   (a) a component; and
   (b) a temperature-dependent, first fluorescent dye;
   wherein the temperature-dependent, first fluorescent dye in a first state has predetermined first chromaticity coordinates and in a second state has predetermined second chromaticity coordinates different from the first chromaticity coordinates;
   wherein the temperature-dependent, first fluorescent dye is disposed on or integrated in the component so that the temperature-dependent, first fluorescent dye, in dependence on a temperature change acting on the temperature-dependent, first fluorescence dye, creates an optically recognizable color change from the first chromaticity coordinates to the second chromaticity coordinates, the color change being detectable with at least one of a sensor system and a human eye; and wherein the temperature-dependent, first fluorescent dye has a luminescence spectrum that depends on temperature, wherein at least one of the luminescence spectrum of the temperature-dependent, first fluorescent dye and the chromaticity coordinates of the temperature-dependent, first fluorescent dye, on passing through a temperature interval that extends from a first temperature to a second temperature, undergoes a continuous, steady and reversible transition between the first chromaticity coordinates reached at the first temperature and the second chromaticity coordinates reached at the second temperature, wherein the first temperature and the second temperature are at most as high as room temperature and differ from one another by at least 20 degrees Celsius.

2. The arrangement according to claim 1, wherein the first temperature and the second temperature differ from one another by at least 40 degrees Celsius.

3. The arrangement according to claim 1, wherein the temperature-dependent, first fluorescent dye is configured such that at least one of the luminescence spectrum of the temperature-dependent, first fluorescent dye and the average wavelength of the luminescence spectrum of the temperature-dependent, first fluorescent dye continuously, steadily and reversibly changes by in total at least 0.5 nm per one degree Celsius temperature change due to temperature change at least within a temperature interval lying below a room temperature of 21° C. and having a temperature difference of at least 15° C.

4. The arrangement according to claim 1, wherein the temperature-dependent, first fluorescent dye is configured such that at least one of the luminescence spectrum of the temperature-dependent, first fluorescent dye and the average wavelength of the luminescence spectrum of the temperature-dependent, first fluorescent dye continuously, steadily and reversibly changes by in total at least 0.5 nm per one degree Celsius temperature change due to temperature change at least within a temperature interval lying below a room temperature of 21° C. and having a temperature difference of at least 30° C.

5. The arrangement according to claim 1, further comprising a temperature-independent, second fluorescent dye, wherein the temperature-independent, second fluorescent dye has predetermined chromaticity coordinates matched to the first chromaticity coordinates or the second chromaticity coordinates of the temperature-dependent, first fluorescent dye and forms a reference color for the first chromaticity coordinates or the second chromaticity coordinates and, in a manner bordering the temperature-dependent first fluorescent dye, is disposed on or integrated in the component.

6. The arrangement according to claim 5, wherein the temperature-dependent, first fluorescent dye and the temperature-independent second fluorescent dye are configured such that the first chromaticity coordinates or the second chromaticity coordinates of the temperature-dependent, first fluorescent dye and the predetermined chromaticity coordinates of the temperature-independent second fluorescent dye are matched to one another in dependence on a predetermined viewing angle.

7. The arrangement according to claim 1, wherein the component is formed optically transparently in a spectral region that extends from the first chromaticity coordinates of the temperature-dependent, first fluorescent dye up to and including the second chromaticity coordinates of the temperature-dependent, first fluorescent dye.

8. The arrangement according to claim 5, wherein the temperature-dependent, first fluorescent dye and the temperature-independent, second fluorescent dye are configured to be matched to one another so as to coincide color-wise for a human eye in daylight and so that at least one of the luminescence spectrum of the temperature-dependent, first and temperature-independent, second fluorescent dyes and the average wavelengths of luminescence spectra of the temperature-dependent, first and temperature-independent, second fluorescent dyes under incident UV radiation at room temperature differ by 5 nm at maximum, whereas at least one of the chromaticity coordinates and the average wavelengths of the luminescence spectra under incident UV radiation differ from one another at a temperature that lies at least 20° C. below the room temperature.

9. The arrangement according to claim 1, wherein the component is formed at least as one part of a label arrangement.

10. The arrangement according to claim 5, wherein the arrangement is a label arrangement for a security feature, wherein the component is formed as a label layer, and the temperature-dependent, first fluorescent dye and the temperature-independent, second fluorescent dye bordering the temperature-dependent, first fluorescent dye are disposed in or on the label layer.

11. The arrangement according to claim 10, further comprising a temperature-independent, third fluorescent dye, wherein the temperature-independent, third fluorescent dye, in a manner bordering the temperature-dependent, first fluorescent dye, is disposed on or integrated in the label layer, wherein the temperature-dependent, first fluorescent dye and the temperature-independent second fluorescent dye are configured such that the predetermined chromaticity coordinates of the temperature-independent, second fluorescent dye is matched to one of the first and second chromaticity coordinates of the temperature-dependent, first fluorescent dye, and wherein the temperature-dependent, first fluorescent dye and the temperature-independent third fluorescent dye are configured such that the temperature-independent, third fluorescent dye has, under incident UV radiation, predetermined chromaticity coordinates matched to the other of the first and second chromaticity coordinates of the temperature-dependent, first fluorescent dye.

12. An article, wherein the article is provided with a security feature that can be checked under ultraviolet illumination, wherein the security feature comprises an arrangement comprising:

(a) a component; and (b) a temperature-dependent, first fluorescent dye;

wherein the temperature-dependent, first fluorescent dye in a first state has a predetermined first chromaticity coordinates and in a second state has a predetermined second chromaticity coordinates different from the first chromaticity coordinates; and wherein the temperature-dependent, first fluorescent dye is disposed on or integrated in the component so that the temperature-dependent, first fluorescent dye, in dependence on a temperature change acting on the temperature-dependent, first fluorescent dye, creates an optically recognizable color change from the first chromaticity coordinates to the second chromaticity coordinates, the color change being detectable with at least one of a sensor system and a human eye; and wherein the temperature-dependent, first fluorescent dye has a luminescence spectrum that depends on temperature, wherein at least one of the luminescence spectrum of the temperature-dependent, first fluorescent dye and the chromaticity coordinates of the temperature-dependent, first fluorescent dye, on passing through a temperature interval that extends from a first temperature to a second temperature, undergoes a continuous, steady and reversible transition between the first chromaticity coordinates reached at the first temperature and the second chromaticity coordinates reached at the second temperature, wherein the first temperature and the second temperature are at most as high as room temperature and differ from one another by at least 20 degrees Celsius.

13. A method for manufacturing an arrangement for a security feature of an article, the method comprising:
(a) providing a layer with an upper side and an underside;
(b) providing a temperature-dependent, first fluorescent dye, wherein the temperature-dependent, first fluorescent dye in a first state has a predetermined first chromaticity coordinates and in a second state has a second chromaticity coordinates different from the first chromaticity coordinates; and
(c) applying the temperature-dependent, first fluorescent dye on the upper side of the layer so that the temperature-dependent, first fluorescent dye, in dependence on a temperature change acting on the temperature-dependent, first fluorescent dye, creates an optically recognizable color change from the first chromaticity coordinates to the second chromaticity coordinates, the color change being detectable with at least one of a sensor system and a human eye;

wherein the temperature-dependent, first fluorescent dye has a luminescence spectrum that depends on temperature, wherein at least one of the luminescence spectrum of the temperature-dependent, first fluorescent dye and the chromaticity coordinates of the temperature-dependent, first fluorescent dye, on passing through a temperature interval that extends from a first temperature to a second temperature, undergoes a continuous, steady and reversible transition between the first chromaticity coordinates reached at the first temperature and the second chromaticity coordinates reached at the second temperature, wherein the first temperature and the second temperature are at most as high as room temperature and differ from one another by at least 20 degrees Celsius.

14. The method according to claim 13, further comprising:
providing a temperature-independent, second fluorescent dye, wherein the temperature-independent, second fluorescent dye has a predetermined chromaticity coordinates matched to the first chromaticity coordinates or the second chromaticity coordinates of the temperature-dependent first fluorescent dye; and
applying the temperature-independent, second fluorescent dye on the upper side of the layer.

15. The method according to claim 14, wherein at least one of the temperature-dependent, first fluorescent dye and the temperature-independent, second fluorescent dye comprises a printable substance and wherein at least one of the temperature-dependent, first fluorescent dye and the temperature-independent, second fluorescent dye is applied by printing the at least one of the temperature-dependent, first fluorescent dye and the temperature-independent, second fluorescent dye on the upper side of the layer.

16. The method according to claim 14, wherein the temperature-dependent, first fluorescent dye and the temperature-independent, second fluorescent dye are provided by:
forming the first chromaticity coordinates of the temperature-dependent, first fluorescent dye at room temperature under ultraviolet light;
forming the chromaticity coordinates of the temperature-independent, second fluorescent dye at room temperature under ultraviolet light and adapting the chromaticity coordinates of the temperature-independent, second fluorescent dye to the first chromaticity coordinates of the temperature-dependent, first fluorescent dye at room temperature under ultraviolet light;
checking the respective chromaticity coordinates of the temperature-dependent, first fluorescent dye and of the temperature-independent, second fluorescent dye at room temperature under normal light; and
iteratively matching the respective chromaticity coordinates of the temperature-dependent, first and temperature-independent, second fluorescent dyes with one another at room temperature under normal light and of the respective chromaticity coordinates of the temperature-dependent, first and temperature-independent, second fluorescent dyes with one another at room temperature under ultraviolet light, if at least one of the chromaticity coordinates of the temperature-dependent, first and temperature-independent, second fluorescent dyes under ultraviolet light and the chromaticity coordinates of the temperature-dependent, first and temperature-independent, second fluorescent dyes under daylight do not coincide or do not yet coincide within a tolerance range.

17. The method according to claim 16, wherein the respective chromaticity coordinates of the temperature-dependent, first and temperature-independent, second fluorescent dyes are iteratively matched with one another by:
admixing a white color pigment with the temperature-independent, second fluorescent dye and thereby changing the chromaticity coordinates of the temperature-independent, second fluorescent dye; and
checking the chromaticity coordinates of the temperature-dependent, first and temperature-independent, second fluorescent dyes at room temperature under normal light and under ultraviolet light.

* * * * *